United States Patent
Kucherov et al.

(10) Patent No.: US 10,691,355 B2
(45) Date of Patent: Jun. 23, 2020

(54) APPARATUS, METHOD AND COMPUTER PROGRAM PRODUCT FOR CONTROLLED ORDERING OF DATA PAGES FOR MIGRATION FROM SOURCE STORAGE SYSTEM INTO TARGET STORAGE SYSTEM

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/179,464

(22) Filed: Nov. 2, 2018

(65) Prior Publication Data

US 2020/0142617 A1    May 7, 2020

(51) Int. Cl.
*G06F 3/06* (2006.01)
*H04L 9/06* (2006.01)

(52) U.S. Cl.
CPC .......... *G06F 3/0622* (2013.01); *G06F 3/0647* (2013.01); *G06F 3/0679* (2013.01); *H04L 9/0643* (2013.01)

(58) Field of Classification Search
CPC .................................................. G06F 3/0622
See application file for complete search history.

(56) References Cited

U.S. PATENT DOCUMENTS

| | | | |
|---|---|---|---|
| 7,080,225 B1 * | 7/2006 | Todd ........................ | G06F 3/061 711/154 |
| 7,444,464 B2 | 10/2008 | Urmston et al. | |
| 8,095,726 B1 | 1/2012 | O'Connell et al. | |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.
EMC Corporation, "Unstoppable Data Reduction: Always-on, In-Line, Zero-Penalty, Enterprise-Class, Free," https://store.emc.com/xtremio, Jul. 2014, 2 pages.

(Continued)

*Primary Examiner* — Edan Orgad
*Assistant Examiner* — Won Tae C Kim
(74) *Attorney, Agent, or Firm* — Ryan, Mason & Lewis, LLP

(57) ABSTRACT

An apparatus in an illustrative embodiment comprises at least one processing device comprising a processor coupled to a memory. The processing device is configured to identify a storage volume to be migrated from a source storage system to a target storage system, and to issue one or more commands to at least one of the source storage system and a host device as part of a migration session for the storage volume. Responsive to the one or more commands, a plurality of data pages are received, with the data pages having respective hash values that are computed based at least in part on a native page size of the target storage system as specified in at least one of the one or more commands. The one or more commands illustratively comprise a plurality of read next page commands, with a given one of the read next page commands including information identifying the storage volume, the native page size of the target storage system, and the migration session.

20 Claims, 9 Drawing Sheets

(56) References Cited

U.S. PATENT DOCUMENTS

| | | | |
|---|---|---|---|
| 8,214,612 B1 | 7/2012 | Natanzon | |
| 8,712,963 B1 * | 4/2014 | Douglis | G06F 11/2094 707/625 |
| 9,104,326 B2 | 8/2015 | Frank et al. | |
| 9,208,162 B1 * | 12/2015 | Hallak | G06F 11/2094 |
| 9,286,003 B1 | 3/2016 | Hallak et al. | |
| 9,552,258 B2 | 1/2017 | Hallak et al. | |
| 9,606,870 B1 | 3/2017 | Meiri et al. | |
| 9,716,754 B2 | 7/2017 | Swift | |
| 2008/0279462 A1 | 11/2008 | Celi, Jr. | |
| 2009/0132955 A1 | 5/2009 | Garg et al. | |
| 2010/0179941 A1 | 7/2010 | Agrawal et al. | |
| 2013/0325824 A1 | 12/2013 | Shoens | |
| 2014/0181016 A1 | 6/2014 | Whitehead et al. | |
| 2015/0234703 A1 * | 8/2015 | Udayashankar | G06F 11/1004 707/646 |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2017/0192857 A1 | 7/2017 | Meiri et al. | |

OTHER PUBLICATIONS

Emc Corporation, "Introduction to XtremIO Virtual Copies," White Paper, Mar. 2016, 39 pages.

Emc Corporation, "XtrernIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation AII-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

| ADDRESS-TO-HASH (A2H) TABLE | | |
|---|---|---|
| LOGICAL ADDRESS 1 | HASH HANDLE OF DATA PAGE | OTHER FIELDS |
| LOGICAL ADDRESS 2 | HASH HANDLE OF DATA PAGE | OTHER FIELDS |
| ... | ... | ... |
| LOGICAL ADDRESS M | HASH HANDLE OF DATA PAGE | OTHER FIELDS |

TABLE KEY

HASH-TO-DATA (H2D) TABLE

| HASH HANDLE 1 | PHYSICAL OFFSET OF DATA PAGE | OTHER FIELDS |
| HASH HANDLE 2 | PHYSICAL OFFSET OF DATA PAGE | OTHER FIELDS |
| ... | | |
| HASH HANDLE D | PHYSICAL OFFSET OF DATA PAGE | OTHER FIELDS |

TABLE KEY (Hash Handle column)

HASH METADATA (HMD) TABLE — 304

| HASH HANDLE 1 | REF COUNT 1 | PHYSICAL OFFSET OF DATA PAGE |
| HASH HANDLE 2 | REF COUNT 2 | PHYSICAL OFFSET OF DATA PAGE |
| ... | | ... |
| HASH HANDLE H | REF COUNT H | PHYSICAL OFFSET OF DATA PAGE |

TABLE KEY

FIG. 3C

PHYSICAL LAYER BASED (PLB) TABLE

| | | |
|---|---|---|
| PHYSICAL OFFSET 1 | HASH DIGEST OF DATA PAGE | OTHER FIELDS |
| PHYSICAL OFFSET 2 | HASH DIGEST OF DATA PAGE | OTHER FIELDS |
| ... | ... | |
| PHYSICAL OFFSET P | HASH DIGEST OF DATA PAGE | OTHER FIELDS |

TABLE KEY

APPARATUS, METHOD AND COMPUTER PROGRAM PRODUCT FOR CONTROLLED ORDERING OF DATA PAGES FOR MIGRATION FROM SOURCE STORAGE SYSTEM INTO TARGET STORAGE SYSTEM

FIELD

The field relates generally to information processing systems, and more particularly to storage in information processing systems.

BACKGROUND

Many information processing systems are configured to migrate data from one storage system to another, with the storage systems possibly being located in different data centers or otherwise at different physical sites. For example, an enterprise may migrate data from a source storage system to a target storage system in conjunction with a storage system replacement, reconfiguration or other type of upgrade. In conventional migration approaches, issues can arise when data pages are transferred from the source storage system to the target storage system, particularly if the target storage system utilizes cache-based deduplication. As the size of the cache is usually very limited, the achievable deduplication ratios of the target storage system can be adversely impacted under conventional migration approaches, and may be significantly worse than those of the source storage system. Such issues can be particularly problematic in migration scenarios in which the target storage system utilizes a larger native page size than the source storage system.

SUMMARY

Illustrative embodiments provide controlled ordering of data page transfers for migration of one or more storage volumes from a source storage system to a target storage system. Such arrangements advantageously allow cache-based deduplication performed in the target storage system to achieve an enhanced deduplication ratio relative to that which would otherwise be achieved absent the controlled ordering. These advantages are obtained even in migration scenarios in which the target storage system has a larger native page size than that of the source storage system.

The target storage system is illustratively implemented as a content addressable storage system, but the source storage system need not be a content addressable storage system, and can instead be what is referred to herein as a "traditional" storage array, which is a storage array that does not support any type of content addressable storage functionality, and possibly does not even include any ability to generate hash digests or other content-based signatures of data pages. As another example, the source storage system can be a very simple storage device with no special capabilities. In these and other embodiments in which the source storage system is unable to generate hash digests or other content-based signatures of data pages, that functionality can be provided by a host device.

In one embodiment, an apparatus comprises at least one processing device comprising a processor coupled to a memory. The processing device is configured to identify a storage volume to be migrated from a source storage system to a target storage system, and to issue one or more commands to at least one of the source storage system and a host device as part of a migration session for the storage volume. Responsive to the one or more commands, a plurality of data pages are received, with the data pages having respective hash values that are computed based at least in part on a native page size of the target storage system as specified in at least one of the one or more commands.

A given one of the hash values for a corresponding one of the received data pages comprises a hash value of that data page in the native page size of the target storage system and is determined based at least in part on multiple hash values for respective multiple source data pages each in a native page size of the source storage system.

The one or more commands in some embodiments illustratively comprise a plurality of read next page commands, with a given one of the read next page commands including information identifying the storage volume, the native page size of the target storage system and the migration session.

The processing device in some embodiments is part of the target storage system, and more particularly implements a storage controller of the target storage system, although numerous alternative implementations are possible. For example, in other embodiments the processing device is implemented in a host device configured to communicate over a network with the source and target storage systems. Again, these are only examples, and alternative implementations are possible.

The storage volume illustratively comprises at least one logical storage volume comprising at least a portion of a physical storage space of one or more of storage devices. The term "storage volume" as used herein is therefore intended to be broadly construed, so as to encompass a set of one or more logical storage volumes.

The target storage system in some embodiments comprises a clustered implementation of a content addressable storage system having a distributed storage controller. The content addressable storage system in arrangements of this type is illustratively configured to utilize non-volatile memory storage devices, such as flash-based storage devices. For example, the storage devices of the target storage system in such embodiments can be configured to collectively provide an all-flash storage array.

The source storage system can similarly comprise an all-flash storage array, or another type of content addressable storage system, and may utilize a different secure hashing algorithm than the target storage system.

Alternatively, the source storage system can be a traditional storage array without content addressable storage functionality. In some embodiments of this type, the source storage system, even though it does not support content addressable storage, nonetheless incorporates functionality for generating hash digests or other content-based signatures in response to a command received from the target storage system. In other embodiments of this type, the source storage system does not incorporate functionality for generating hash digests or other content-based signatures in response to a command received from the target storage system, and such functionality is instead provided by a host device. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIGS. 3A, 3B, 3C and 3D show examples of logical layer and physical layer mapping tables utilized in migration of storage volumes in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
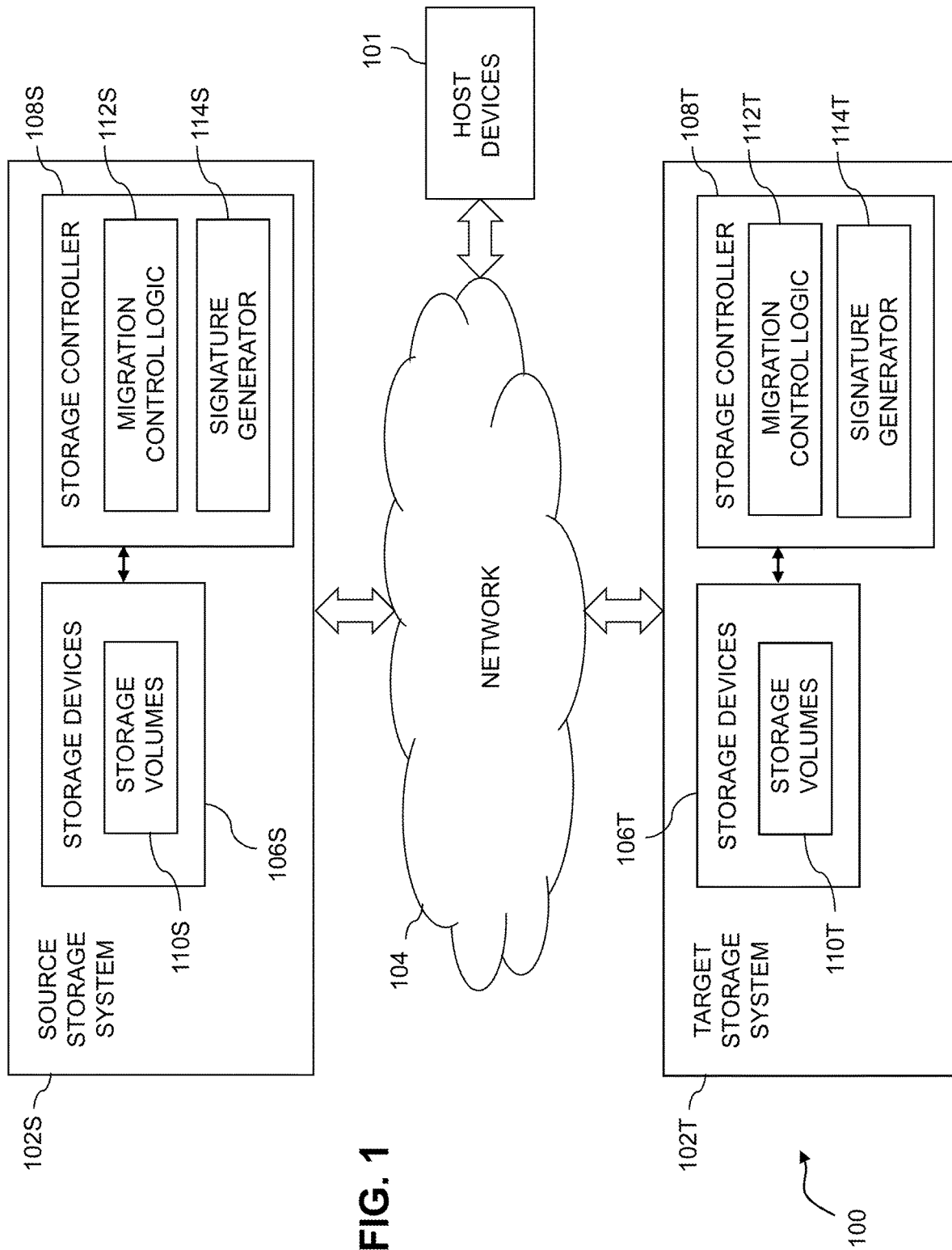
FIG. 1 is a block diagram of an information processing system comprising source and target storage systems configured for controlled ordering of data page transfers in migration of storage volumes between the storage systems in an illustrative embodiment.

FIG. 1 shows an information processing system 100 configured in accordance with an illustrative embodiment. The information processing system 100 comprises a plurality of host devices 101, a source storage system 102S and a target storage system 102T, all of which are configured to communicate with one another over a network 104. The source and target storage systems 102 are more particularly configured in this embodiment to participate in a migration process in which one or more storage volumes are migrated from the source storage system 102S to the target storage system 102T, possibly with involvement of at least one of the host devices 101.

Each of the storage systems 102 is illustratively associated with a corresponding set of one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input-output (IO) operations that are processed by a corresponding one of the storage systems 102. The term "input-output" as used herein refers to at least one of input and output. For example, IO operations may comprise write requests and/or read requests directed to stored data of a given one of the storage systems 102.

The storage systems 102 illustratively comprise respective processing devices of one or more processing platforms. For example, the storage systems 102 can each comprise one or more processing devices each having a processor and a memory, possibly implementing virtual machines and/or containers, although numerous other configurations are possible.

The storage systems 102 can additionally or alternatively be part of cloud infrastructure such as an Amazon Web Services (AWS) system. Other examples of cloud-based systems that can be used to provide at least portions of the storage systems 102 include Google Cloud Platform (GCP) and Microsoft Azure.

The storage systems 102 may be implemented on a common processing platform, or on separate processing platforms.

The host devices 101 are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, an infrastructure-as-a-service (IaaS) model and/or a function-as-a-service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The source storage system 102S comprises a plurality of storage devices 106S and an associated storage controller 108S. The storage devices 106S store storage volumes 110S. The storage volumes 110S illustratively comprise respective logical units (LUNs) or other types of logical storage volumes.

Similarly, the target storage system 102T comprises a plurality of storage devices 106T and an associated storage controller 108T. The storage devices 106T store storage volumes 110T, at least a portion of which represent respective LUNs or other types of logical storage volumes that are migrated from the source storage system 102S to the target storage system 102T in accordance with a migration process.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, at least one of the storage systems 102 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems 102 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 102 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108S of source storage system 102S in the FIG. 1 embodiment includes migration control logic 112S and a signature generator 114S.

Similarly, the storage controller 108T of target storage system 102T includes migration control logic 112T and a signature generator 114T.

The migration control logic 112 of the storage systems 102 controls performance of the migration process carried out between those storage systems, which as noted above in some embodiments further involves at least one of the host devices 101. The data migrated from the source storage system 102S to the target storage system 102T can include all of the data stored in the source storage system 102S, or only certain designated subsets of the data stored in the source storage system 102S, such as particular designated sets of LUNs or other logical storage volumes. Different migration processes of different types can be implemented for different parts of the stored data.

A given storage volume designated for migration from the source storage system 102S to the target storage system 102T illustratively comprises a set of one or more LUNs or other instances of the storage volumes 110S of the source storage system 102S. Each such LUN or other storage volume illustratively comprises at least a portion of a physical storage space of one or more of the storage devices 106S. The corresponding migrated LUN or other storage volume of the storage volumes 110T of the target storage system 102T illustratively comprises at least a portion of a physical storage space of one or more of the storage devices 106T.

Figure 2:
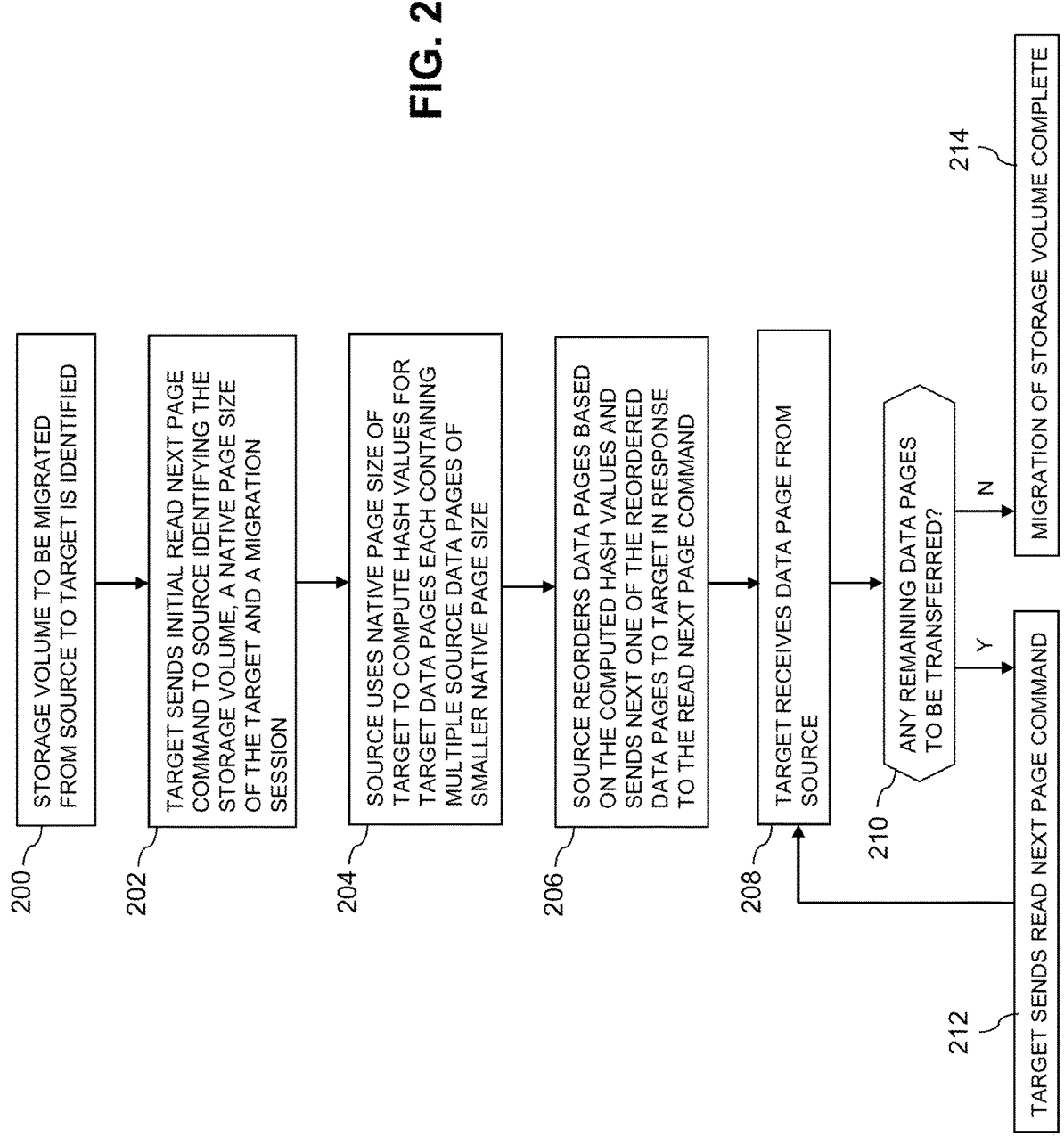
FIG. 2 is a flow diagram of a process for controlled ordering of data page transfers in migration of a storage volume from a source storage system to a target storage system in an illustrative embodiment.

The migration control logic 112 of the storage systems 102 in some embodiments is configured to control the performance of corresponding portions of a migration process of the type illustrated in the flow diagram of FIG. 2. At least one of the host devices 101 in some embodiments can also include one or more instances of migration control logic and possibly also one or more signature generators.

The storage controllers 108 of the storage systems 102 should also be understood to include additional modules and other components typically found in conventional implementations of storage controllers and storage systems, although such additional modules and other components are omitted from the figure for clarity and simplicity of illustration.

In conjunction with a given migration process implemented between the source storage system 102S and the target storage system 102T in the system 100, the target storage system 102T is configured to identify a storage volume to be migrated from the source storage system 102S to the target storage system 102T, and to issue one or more commands to the source storage system 102S as part of a migration session for the storage volume.

The target storage system 102T receives responsive to the one or more commands a plurality of data pages having respective hash values that are computed in the source storage system 102S based at least in part on a native page size of the target storage system as specified in at least one of the one or more commands. These data pages are illustratively ordered by the source storage system 102S using a controlled ordering in which data pages having common hash values are grouped together, thereby facilitating enhanced cache-based deduplication in the target storage system 102T.

In some embodiments, it is assumed that the native page size of the target storage system 102T is larger than the native page size of the source storage system 102S. A given one of the hash values for a corresponding one of the received data pages may be determined based at least in part on multiple hash values for respective multiple data pages in a native page size of the source storage system 102S.

Each of the received data pages illustratively comprises a plurality of data pages in a native page size of the source storage system 102S.

Moreover, the received data pages are received in the target storage system 102T in an order based at least in part on their respective hash values. For example, the received data pages having common hash values are grouped together in the order, illustratively under the control of the source storage system 102S.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 kilobytes (KB), while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein. Also, illustrative embodiments can utilize a particular selected page size or other designated page size in place of a native page size. In some embodiments, the designated page size could be a fixed page size utilized by the storage system in a particular operating mode.

Alternative embodiments in which the source storage system 102S does not include a signature generator can instead utilize one of the host devices 101 to generate the hash values or other content-based signatures. In such an embodiment, the target storage system 102T can send the commands requesting data pages to the host device instead of to the source storage system 102S. For the following description of FIG. 1, it is assumed that the command is sent to the source storage system 102S. Again, such commands can be sent to one of the host devices 101 in other embodiments.

The hash values of the respective data pages illustratively comprise hash digests of the respective data pages, with the hash digests being generated by applying a secure hashing algorithm or other hash function to respective ones of the data pages. Examples of hash functions that may be used in illustrative embodiments include the well-known Secure Hashing Algorithm 1 (SHA1) to the content of its corresponding page. Other types of secure hashing algorithms, such as SHA2 or SHA256, or more generally other hash functions, can be used in generating hash digests or other content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

Hash digests and hash handles are both also considered examples of "hash values" as that term is also broadly used herein. A given hash value is assumed to be generated at least in part using a secure hashing algorithm or other type of hash function.

The secure hashing algorithm utilized to generate the hash values in the source storage system 102S illustratively comprises the same secure hashing algorithm that is utilized in implementing content addressable storage of the data page in the target storage system 102T. That same secure hashing algorithm need not be utilized in implementing content addressable storage of the data page in the source storage system 102S. For example, in some embodiments, the source and target storage systems 102 can each utilize a different secure hashing algorithm to generate hash digests.

As another example, the source storage system 102S may be configured without any secure hashing algorithm or other signature generation functionality, in which case that functionality may be supplied by a given one of the host devices 101.

Illustrative embodiments utilize address metadata to provide content addressable storage functionality. The address metadata in some embodiments comprises at least a portion of one or more logical layer mapping tables that map logical addresses of respective ones of the data pages of the storage volume to corresponding content-based signatures of the respective data pages. Examples of logical layer mapping tables and other metadata structures maintained by at least the storage controller 108T of target storage system 102T will be described below in conjunction with FIGS. 3A through 3D.

In some embodiments, the one or more commands sent by the target storage system 102T to the source storage system 102S as part of the migration session comprise a plurality of read next page commands. A given one of the read next page commands illustratively includes information identifying the storage volume (e.g., a LUN or a set of LUNs), the native page size of the target storage system, and the migration session.

The source storage system 102S illustratively responds to a given such read next page commands by returning a response that includes an identifier of the storage volume, a logical address (e.g., offset) of the data page, and the data page itself. If the last data page has already been returned for the current migration session, the source storage system can instead respond with a unit-check indication.

The given read next page command or other command utilized by the target storage system 102T to request data pages from source storage system 102S in some embodiments illustratively comprises a Small Computer System Interface (SCSI) command of a particular type suitable for use in requesting a data page having a designated logical address. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

The migration process implemented in system 100 is configured to provide an optimal ordering or other enhanced ordering of the data pages to be transferred from the source storage system 102S to the target storage system 102T, so as to optimize or otherwise enhance the deduplication ratio that is achievable in the target storage system 102T, under an assumption that the target storage system 102T implements cache-based deduplication with a limited cache size. The enhanced ordering of the data pages more particularly increases the likelihood that data pages having the same hash values will be present in the cache at the same time, resulting in improved deduplication performance.

The target storage system 102T in the present embodiment is an example of a "deduplicated" storage system that utilizes content addressable storage functionality to prevent duplicate storage of data pages having the same content, and instead allows multiple distinct logical addresses to point to the same physical data page via a common hash digest generated from the data page content. As mentioned previously, in embodiments in which cache-based deduplication is performed in the target storage system 102T, the limited size of the cache can unduly constrain the deduplication performance, and illustrative embodiments significantly alleviate this serious problem.

As noted above, in some embodiments the source storage system 102S is a traditional storage array, without content addressable storage functionality, but possibly with an ability to generate content-based signatures.

For example, the source storage system 102S is illustratively configured to support a read next page command of the type described previously that returns data pages in a native page size of the target storage system 102T with respective computed and ordered hash values, assuming that the native page size of the source storage system 102S is smaller than the native page size of the target storage system 102T. Alternatively, the source storage system 102S need not include any ability to generate content-based signatures. The source storage system 102S could therefore be a very simple storage device with no special capabilities, such as a disk-based storage device connected via a USB connection to the target storage system 102T. In these and other embodiments, one or more of the host devices 101 can be configured to have the ability to generate content-based signatures.

Accordingly, in some embodiments, the read next page command is directed by the target storage system 102T to the source storage system 102S, and in other embodiments, the read next page command is directed by the target storage system 102T to one of the host devices 101. Embodiments of the latter type can utilize migration software implemented on the host device to carry out portions of the migration process.

The above-described operations carried out in conjunction with a process for migration involving the storage systems 102 are illustratively performed at least in part under the control of the migration control logic 112. As is apparent from the foregoing description, such operations utilize hash digests, hash handles or other types of content-based signatures generated by the signature generators 114.

The storage systems 102 in the FIG. 1 embodiment are assumed to be implemented using at least one processing platform each comprising one or more processing devices each having a processor coupled to a memory. Such processing devices can illustratively include particular arrangements of compute, storage and network resources.

The storage systems 102 may be implemented on respective distinct processing platforms, although numerous other arrangements are possible. At least portions of their associated host devices may be implemented on the same processing platforms as the storage systems 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 102 to reside in different data centers. Numerous other distributed implementations of the storage systems 102 and their respective associated sets of host devices are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, storage systems 102, network 104, storage devices 106, storage controllers 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for controlled ordering of data page transfers for migration can be implemented in one or more host devices, or partially in a host device and partially in a storage system. Accordingly, illustrative embodiments are not limited to arrangements in which all such functionality is implemented in source and target storage systems or a host device, and therefore encompass various hybrid arrangements in which the functionality is distributed over one or more storage systems and one or more associated host devices, each comprising one or more processing devices.

As another example, it is possible in some embodiments that the source storage system and the target storage system can comprise the same storage system. In such an arrangement, a migration process with controlled ordering of data page transfers is illustratively implemented to migrate data from one portion of the storage system to another portion of the storage system. The terms "source storage system" and "target storage system" as used herein are therefore intended to be broadly construed so as to encompass such possibilities.

The operation of the information processing system 100 will now be described in further detail with reference to the flow diagram of the illustrative embodiment of FIG. 2, which implements a migration process with controlled ordering of data page transfers. The steps of the process illustratively involve interactions between a source storage system and a target storage system, referred to as respective "source" and "target" in these figures, illustratively utilizing migration control logic instances and signature generators of storage controllers of the source and target. It is possible in other embodiments that the source storage system does not include migration control logic and a signature generator, and in such embodiments these components are instead implemented in one or more host devices.

The migration process as illustrated in FIG. 2 includes steps 200 through 214, and is suitable for use in system 100 but is more generally applicable to other types of information processing systems in which data is migrated from source to target.

In step 200, a storage volume to be migrated from the source to the target is identified. Such identification can be performed by the source or the target, or possibly by an associated host device. Each of multiple ones of the source and target, and in some cases also the host device, will typically identify the storage volume. More generally, multiple entities such as source and target participating in a given migration process will each identify the storage volume to be migrated from source to target.

The identified storage volume is illustratively one of a plurality of logical storage volumes stored in the source, such as one of the storage volumes 110S of source storage system 102S, that is designated for migration to a corresponding one of the storage volumes 110T of target storage system 102T. Multiple storage volumes can be designated for migration in step 200 as part of the migration process. For example, one or more sets of storage volumes each comprising a plurality of storage volumes can be designated. It will be assumed for clarity and simplicity of the following description that a single storage volume is designated, but the techniques described can be extended in a straightforward manner to multiple designated storage volumes as well as multiple sets of storage volumes.

In step 202, the target sends an initial read next page command to the source. The initial read next page command identifies the storage volume to be migrated, the native page size of the target to be used in the migration, and the migration session.

In step 204, the source uses the native page size of the target to compute hash values for target data pages each containing multiple source data pages of a smaller native page size. This embodiment therefore assumes that the source includes a signature generator and can generate a hash digest, hash handle or other content-based signature of the target data page that comprises multiple smaller-size source data pages. In other embodiments, such as those in which the source does not include such functionality, the read next page command can instead be directed by the target to a host device that is configured to generate the hash values for the respective target data pages, possibly utilizing source data pages and their respective hash values supplied to it by the source.

In step 206, the source reorders the data pages based on the computed hash values for the respective target data pages, and sends the next one of the reordered data pages to the target in response to the read next page command. The reordering is illustratively a reordering of the data pages into an order of increasing or decreasing hash values, although other types of reordering arrangements could be used.

It should be noted that, in the present embodiment, the computation and reordering of steps 204 and 206 occur in the source in conjunction with the initial read next page command received in the migration session for the identified storage volume. Accordingly, such operations are not repeated for each read next page command. For example, the source can cache the results and utilize those cached results in responding to subsequent read next page commands received from the target. Numerous other arrangements of computation and reordering can be used to provide a controlled ordering of data page transfers from the source into the target in other illustrative embodiments.

In step 208, the target receives the data page from the source, in response to the initial read next page command.

In step 210, a determination is made as to whether or not there are any remaining data pages to be transferred as part of the migration of the storage volume. If there is at least one page remaining to be transferred, the process moves to step 212, and otherwise moves to step 214 as shown.

In step 212, the target sends another read next page command to the source in order to obtain the next data page. The process then returns to step 208 as shown, in which the requested next data page is received from the source. One or more additional iterations of steps 210, 212 may be performed.

In step 214, which is reached if the last data page has already been transferred from the source to the target, the migration of the storage volume is complete. In some embodiments, the source can return to the target a unit-check indicator or other type of indication that the last data page has been transferred to the target.

The above-described process ensures that the data pages are transferred from the source to the target in a manner that increases the likelihood that duplicate data pages having the same hash value will be in the limited-size cache of the target at the same time, and therefore subject to deduplication as part of cache-based deduplication functionality that is assumed to be implemented in the target in the present embodiment.

As a more particular example, assume that the storage volume as stored in the source using its smaller native page size includes data pages having the sequence of hashes as follows, where each distinct letter corresponds to a different unique hash value:

AFDERYAFBCDEAF

In this example of 14 data pages, there are multiple pairs of pages that are duplicates, including three pairs with consecutive hash values AF. If these 14 pages were simply reordered by the source based on hash value using the native page size of the source, it would result in the following reordering of data pages:

AAABCDDEEFFFRY

In some cases, this source data page reordering arrangement could lead to no deduplication in the target, as the reordering has resulted in a separation of the A and F hash values by an amount that might prevent them from being in the limited-size cache at the same time. As a result, the desired deduplication of the AF pairs may not be achieved, leading to a reduced deduplication ratio.

Further assume that the source uses a native page size that is one-half the native page size of the target. For example, the source could have a page size of 4 KB and the target could have a page size of 8 KB.

Applying the above-described ordered page transfer arrangement of FIG. 2, the source receives the initial read next page command indicating that the target page size is 8 KB. The source then combines pairs of source data pages into respective target pages, with two source pages for every target page, and computes hash values for the respective target pages, resulting in the following set of computed hash values for respective 8 KB target pages:

ZNOZPLZ

Each distinct letter in the above represents a unique hash value for one of the target pages. The source then reorders the target pages by sorting in order of hash value, resulting in the following reordering:

LNOPZZZ

The duplicate target pages having the Z values correspond to the three pairs of source pages having the duplicate AF values. Accordingly, the computation and reordering of hash values using the target page size as illustrated in the FIG. 2 process will allow the duplicate source pages having the AF values to be deduplicated as desired in the limited-size cache of the target, as the Z values are adjacent to one another in the reordering, thereby improving the deduplication ratio of the target.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for providing controlled ordering of data page transfers in migration. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different migration processes for respective different sets of one or more storage volumes or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage systems 102 that are configured to control performance of one or more steps of the FIG. 2 process in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

The FIG. 2 process makes use of various metadata structures that are maintained within at least the target storage system. Similar metadata structures can also be maintained in the source storage system in embodiments in which the source storage system supports content addressable storage functionality. Examples of metadata structures maintained by the target storage system in illustrative embodiments include the logical layer and physical layer mapping tables shown in respective FIGS. 3A, 3B, 3C and 3D. It is to be appreciated that these particular tables are only examples, and other tables or metadata structures having different configurations of entries and fields can be used in other embodiments.

Referring initially to FIG. 3A, an address-to-hash ("A2H") table 300 is shown. The A2H table 300 comprises a plurality of entries accessible utilizing logical addresses denoted Logical Address 1, Logical Address 2, . . . Logical Address M as respective keys, with each such entry of the A2H table 300 comprising a corresponding one of the logical addresses, a corresponding one of the hash handles, and possibly one or more additional fields.

FIG. 3B shows a hash-to-data ("H2D") table 302 that illustratively comprises a plurality of entries accessible utilizing hash handles denoted Hash Handle 1, Hash Handle 2, . . . Hash Handle D as respective keys, with each such entry of the H2D table 302 comprising a corresponding one of the hash handles, a physical offset of a corresponding one of the data pages, and possibly one or more additional fields.

Referring now to FIG. 3C, a hash metadata ("HMD") table 304 comprises a plurality of entries accessible utilizing hash handles denoted Hash Handle 1, Hash Handle 2, . . . Hash Handle H as respective keys. Each such entry of the HMD table 304 comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. Although not explicitly so indicated in the figure, the HMD table 304 may also include one or more additional fields.

FIG. 3D shows a physical layer based ("PLB") table 306 that illustratively comprises a plurality of entries accessible utilizing physical offsets denoted Physical Offset 1, Physical Offset 2, . . . Physical Offset P as respective keys, with each such entry of the PLB table 306 comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Also, it is to be appreciated that terms such as "table" and "entry" as used herein are intended to be broadly construed, and the particular example table and entry arrangements of FIGS. 3A through 3D can be varied in other embodiments. For example, additional or alternative arrangements of entries can be used.

In some embodiments, the storage system comprises an XtremIO™ storage array or other type of content addressable storage system suitably modified to incorporate techniques for controlled ordering of data page transfers in migration as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of a given one of the storage systems 102, such as the target storage system 102T, and accordingly is assumed to be coupled to the other one of the storage systems 102 and to one or more host devices of a computer system within information processing system 100.

As mentioned previously, the source storage system 102S need not be a content addressable storage system and need not include any content-based signature generation functionality, and in such an embodiment the content-based signature generation functionality can be implemented in a host device.

The storage controller 408 in the present embodiment is configured to implement migration functionality of the type previously described in conjunction with FIGS. 1 through 3. For example, the content addressable storage system 405 illustratively participates as a target storage system in a migration process with a source storage system that may be implemented as another instance of the content addressable storage system 405, but could instead be implemented as a traditional storage array.

The storage controller 408 includes distributed modules 412 and 414, which are configured to operate in a manner similar to that described above for respective corresponding migration control logic 112 and signature generators 114 of the storage controllers 108 of system 100. Module 412 is more particularly referred to as distributed migration control logic, and illustratively comprises multiple migration control logic instances on respective ones of a plurality of distinct nodes. Module 414 is more particularly referred to as a distributed signature generator, and illustratively comprises multiple signature generation instances on respective ones of the distinct nodes.

Figure 4:
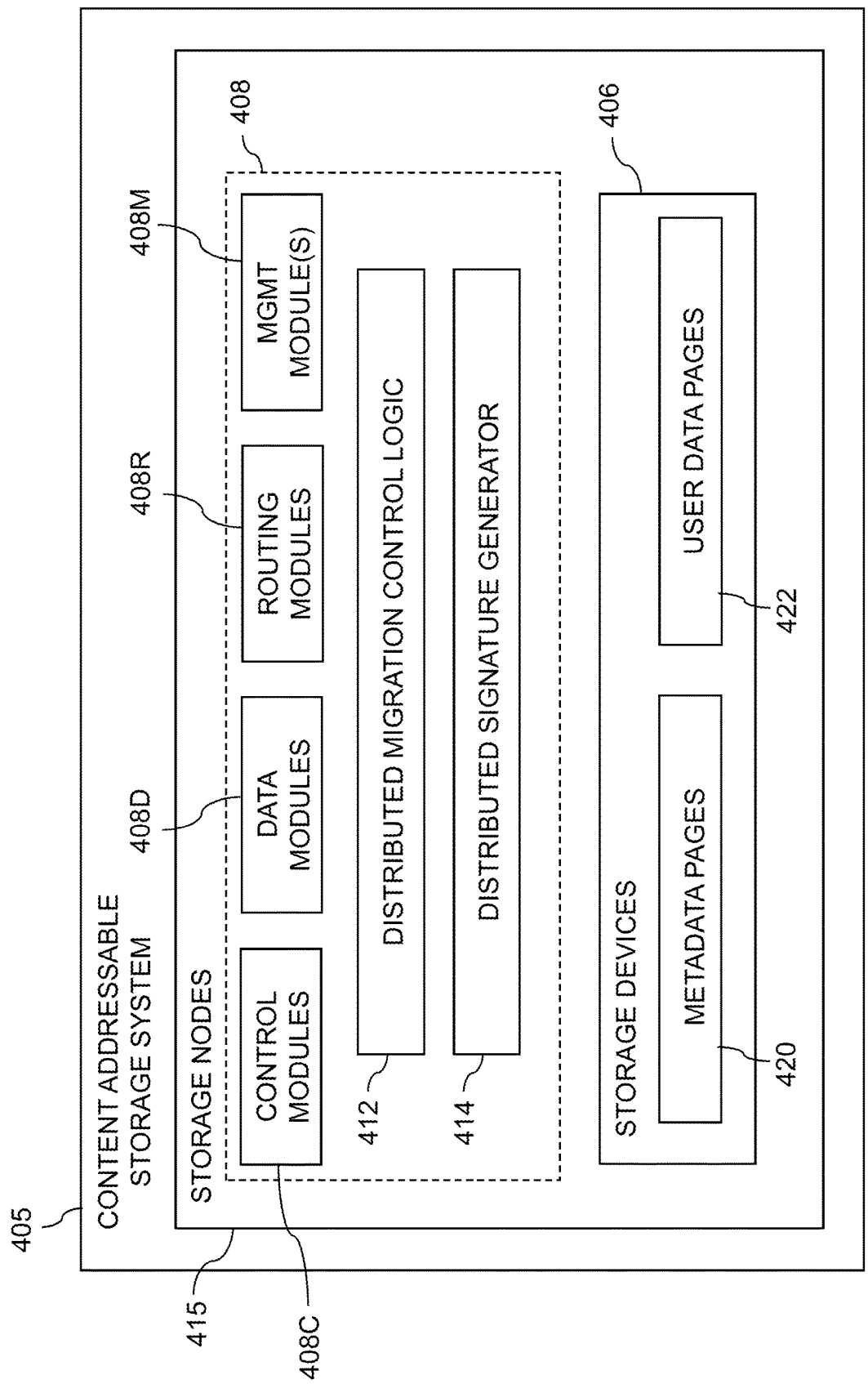
FIG. 4 shows a content addressable storage system having a distributed storage controller configured with functionality for controlled ordering of data page transfers in migration of storage volumes in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the migration functionality of the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

As mentioned previously, a given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used, each of which may be a "native page size" of a corresponding storage system. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The migration functionality provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a migration control logic instance that engages corresponding migration control logic instances in all of the control modules 408C and routing modules 408R in order to implement a migration process with controlled ordering of data page transfers.

In some embodiments, the content addressable storage system 405 comprises an XtremIO™ storage array suitably modified to incorporate techniques for controlled ordering of data page transfers in migration as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, migration functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIOT™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 405. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

Examples of these and other metadata structures utilized in illustrative embodiments will be described below in conjunction with FIGS. 3A through 3D. These particular examples include respective A2H, H2D, HMD and PLB tables. In some embodiments, the A2H and H2D tables are utilized primarily by the control modules 408C, while the HMD and PLB tables are utilized primarily by the data modules 408D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective first and second distinct types. Other types and arrangements of mapping tables or other content-based signature mapping information may be used in other embodiments.

Such mapping tables are still more generally referred to herein as "metadata structures" of the content addressable storage system 405. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement migration functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with functionality for controlled ordering of data page transfers in migration as disclosed herein can provide a number of significant advantages relative to conventional arrangements.

For example, some embodiments are advantageously configured to allow cache-based deduplication performed in the target storage system to achieve an enhanced deduplication ratio relative to that which would otherwise be achieved absent the controlled ordering. Such arrangements are particularly advantageous in migration scenarios in which the target storage system implements cache-based deduplication with a limited-size cache has a larger native page size than that of the source storage system. The source storage system in arrangements of this type illustratively orders the data pages using a controlled ordering in which data pages having common hash values are grouped together, thereby facilitating enhanced cache-based deduplication in the target storage system.

In some embodiments, the target storage system is illustratively implemented as a content addressable storage system, but the source storage system need not be a content addressable storage system, and can instead be a traditional storage array, which does not support any type of content addressable storage functionality, and possibly does not even include any ability to generate hash digests or other types of content-based signatures. In embodiments in which the source storage system is unable to generate hash digests or other types of content-based signatures, that functionality can be provided by a host device.

Accordingly, illustrative embodiments disclosed herein can considerably improve the deduplication performance of a target storage system, particularly in cache-based deduplication of storage volumes migrated from a source storage system having a smaller native page size than the target storage system.

Functionality for controlled ordering of data page transfers in migration can be implemented in a storage system, in a host device, or partially in a storage system and partially in a host device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for controlled ordering of data page transfers in migration will now be described in greater detail with reference to FIGS. 5 and 6. Although described in the context of system 100, these platforms may also be used to implement at least portions of other information processing systems in other embodiments.

Figure 5:
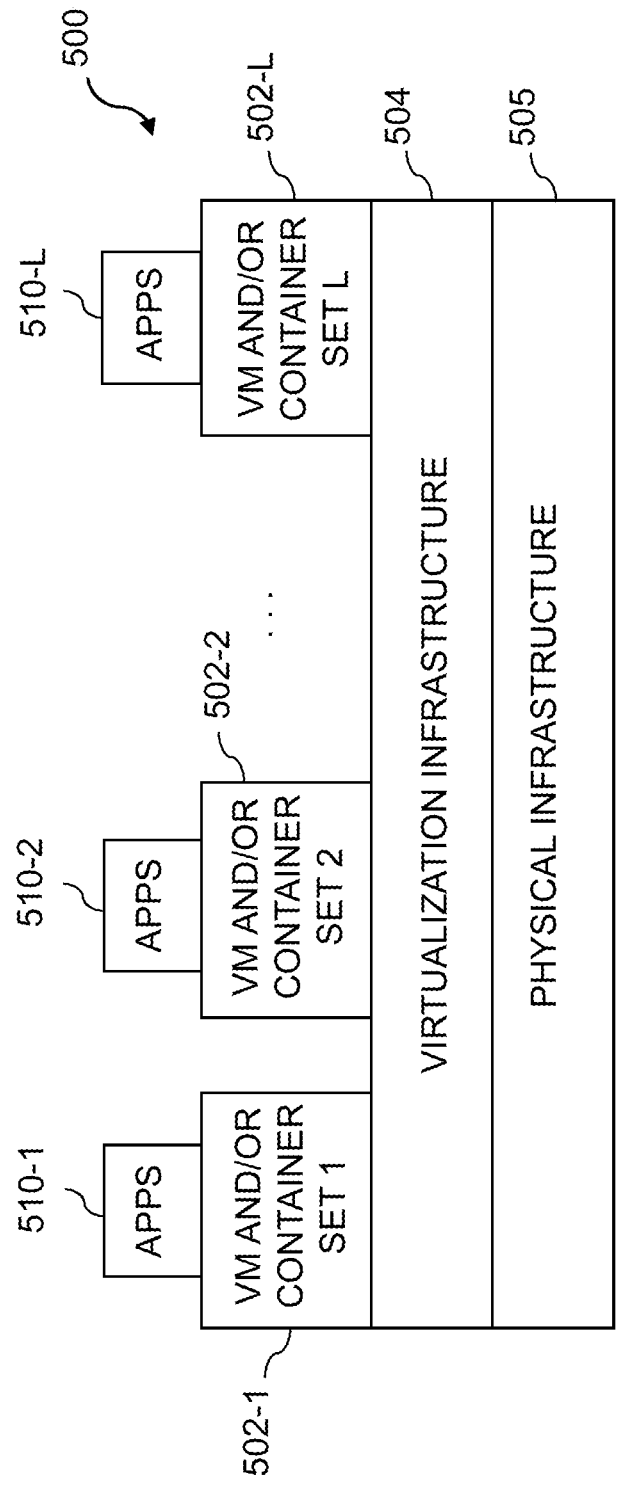
FIGS. 5 and 6 show examples of processing platforms that may be utilized to implement at least a portion of an information processing system in illustrative embodiments.
Figure 6:
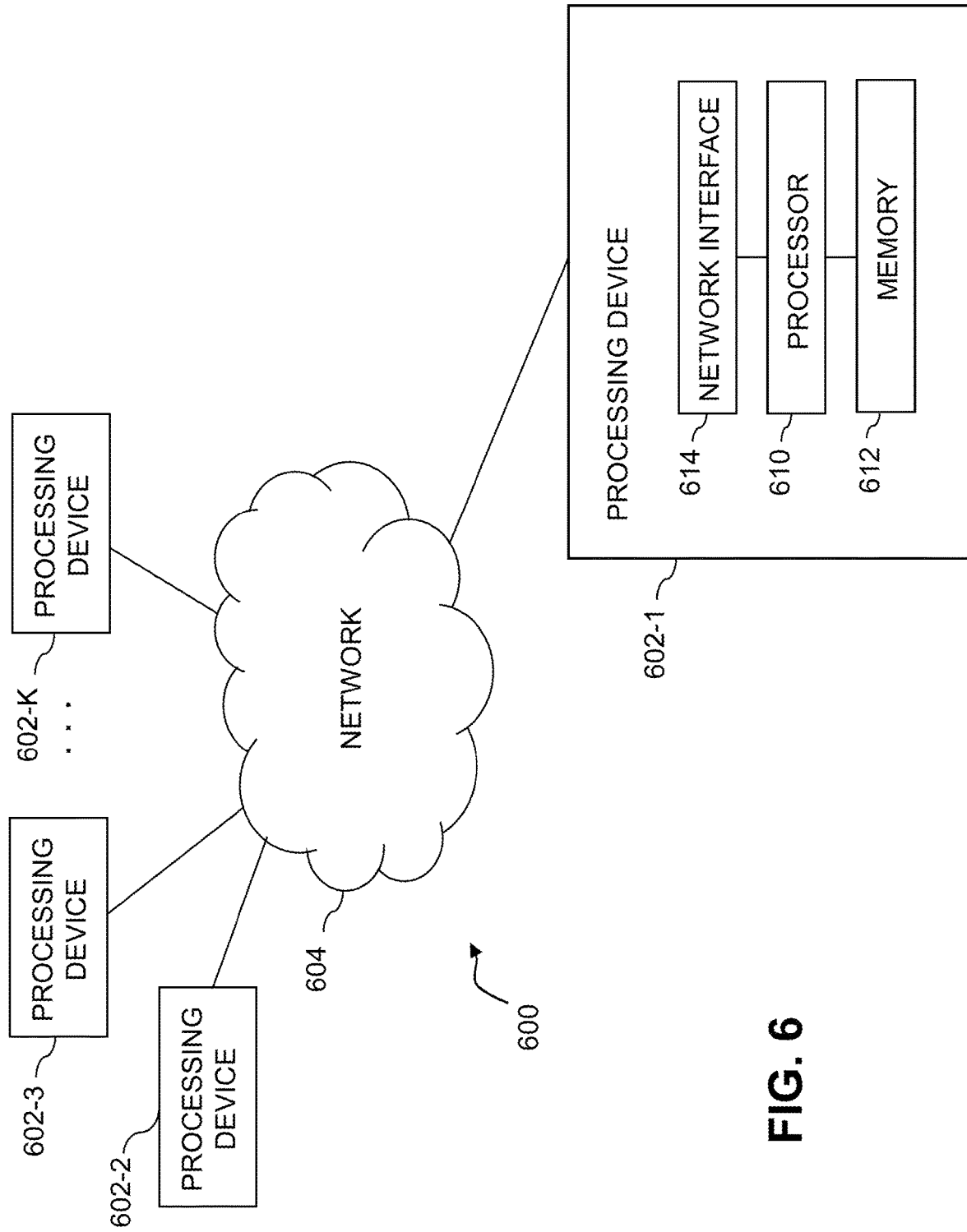

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide migration functionality of the type described above for one or more processes running on a given one of the VMs. For example, each of the VMs can implement migration control logic and/or signature generators for supporting functionality for controlled ordering of data page transfers in migration in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide migration functionality of the type described above. For example, a container host device supporting multiple containers of one or more container sets can implement one or more instances of migration control logic and/or signature generators for supporting functionality for controlled ordering of data page transfers in migration in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the migration functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, migration processes, controlled ordering arrangements, signature generators and associated control logic and metadata structures. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor and a memory, the processor being coupled to the memory;
   the processing device being configured:
   to identify a storage volume to be migrated from a source storage system to a target storage system;
   to issue one or more commands to at least one of the source storage system and a host device as part of a migration session for the storage volume; and
   to receive responsive to the one or more commands a plurality of data pages having respective hash values that are computed based at least in part on a native page size of the target storage system as specified in at least one of the one or more commands;
   wherein the received data pages are received by the target storage system in the native page size of the target storage system and in an order determined based at least in part on their respective hash values where each of the hash values is a hash value of a corresponding one of the received data pages in the native page size of the target storage system; and
   wherein particular ones of the received data pages having common hash values are grouped together immediately adjacent to one another in the order.

2. The apparatus of claim 1 wherein the processing device is implemented in the target storage system.

3. The apparatus of claim 2 wherein the processing device implements a storage controller of the target storage system.

4. The apparatus of claim 1 wherein the hash values of the respective data pages comprise hash digests of the respective data pages with the hash digests being generated by applying a secure hashing algorithm to respective ones of the data pages.

5. The apparatus of claim 1 wherein the hash values of the respective data pages comprise hash handles of the respective data pages with the hash handles being shorter in length than respective hash digests that are generated by applying a secure hashing algorithm to respective ones of the data pages.

6. The apparatus of claim 1 wherein native page size of the target storage system is larger than a native page size of the source storage system.

7. The apparatus of claim 1 wherein a given one of the hash values for a corresponding one of the received data pages comprises a hash value of that data page in the native page size of the target storage system and is determined based at least in part on multiple hash values for respective multiple source data pages each in a native page size of the source storage system.

8. The apparatus of claim 1 wherein each of the received data pages comprises a plurality of data pages in a native page size of the source storage system.

9. The apparatus of claim 1 wherein the one or more commands comprise a plurality of read next page commands.

10. The apparatus of claim 9 wherein a given one of the read next page commands includes information identifying the storage volume, the native page size of the target storage system, and the migration session.

11. The apparatus of claim 9 wherein a given one of the read next page commands comprises a Small Computer System Interface (SCSI) command of a particular type.

12. The apparatus of claim 9 wherein a given one of the read next page commands comprises a vendor unique command of the source and target storage systems.

13. A method comprising:
  identifying a storage volume to be migrated from a source storage system to a target storage system;
  issuing one or more commands to at least one of the source storage system and a host device as part of a migration session for the storage volume; and
  receiving responsive to the one or more commands a plurality of data pages having respective hash values that are computed based at least in part on a native page size of the target storage system as specified in at least one of the one or more commands;
  wherein the received data pages are received by the target storage system in the native page size of the target storage system and in an order determined based at least in part on their respective hash values where each of the hash values is a hash value of a corresponding one of the received data pages in the native page size of the target storage system; and
  wherein particular ones of the received data pages having common hash values are grouped together immediately adjacent to one another in the order.

14. The method of claim 13 wherein a given one of the hash values for a corresponding one of the received data pages comprises a hash value of that data page in the native page size of the target storage system and is determined based at least in part on multiple hash values for respective multiple source data pages each in a native page size of the source storage system.

15. The method of claim 13 wherein the one or more commands comprise a plurality of read next page commands with a given one of the read next page commands including information identifying the storage volume, the native page size of the target storage system, and the migration session.

16. A computer program product comprising a non-transitory processor-readable storage medium having stored therein program code of one or more software programs, wherein the program code when executed by at least one processing device causes said at least one processing device:
  to identify a storage volume to be migrated from a source storage system to a target storage system;
  to issue one or more commands to at least one of the source storage system and a host device as part of a migration session for the storage volume; and
  to receive responsive to the one or more commands a plurality of data pages having respective hash values that are computed based at least in part on a native page size of the target storage system as specified in at least one of the one or more commands;
  wherein the received data pages are received by the target storage system in the native page size of the target storage system and in an order determined based at least in part on their respective hash values where each of the hash values is a hash value of a corresponding one of the received data pages in the native page size of the target storage system determined based at least in part on their respective hash values; and
  wherein particular ones of the received data pages having common hash values are grouped together immediately adjacent to one another in the order.

17. The computer program product of claim 16 wherein a given one of the hash values for a corresponding one of the received data pages comprises a hash value of that data page in the native page size of the target storage system and is determined based at least in part on multiple hash values for respective multiple source data pages each in a native page size of the source storage system.

18. The computer program product of claim 16 wherein the one or more commands comprise a plurality of read next page commands with a given one of the read next page commands including information identifying the storage volume, the native page size of the target storage system, and the migration session.

19. The computer program product of claim 16 wherein the hash values of the respective data pages comprise hash digests of the respective data pages with the hash digests being generated by applying a secure hashing algorithm to respective ones of the data pages.

20. The computer program product of claim 16 wherein the hash values of the respective data pages comprise hash handles of the respective data pages with the hash handles being shorter in length than respective hash digests that are generated by applying a secure hashing algorithm to respective ones of the data pages.

* * * * *